United States Patent [19]

Hoffman

[11] 4,185,290

[45] Jan. 22, 1980

[54] COMPENSATION FOR AERODYNAMIC DRAG ON INK STREAMS FROM A MULTI-NOZZLE INK ARRAY

[75] Inventor: Arthur R. Hoffman, Longmont, Colo.

[73] Assignee: International Business Machines Corporation, Armonk, N.Y.

[21] Appl. No.: 863,300

[22] Filed: Dec. 22, 1977

[51] Int. Cl.² .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 3,739,393 | 6/1973 | Lyon | 346/75 X |
| 3,823,408 | 7/1974 | Gordon | 346/75 X |
| 3,958,249 | 5/1976 | Demaine | 346/75 X |
| 4,019,886 | 4/1977 | Hoffman | 65/43 |
| 4,077,040 | 2/1978 | Hendriks | 346/75 |

OTHER PUBLICATIONS

Fisher et al.; Reducing Drop Misregistration . . . in a Linear Ink Jet Array; IBM Tech. Disc. Bulletin, vol. 17, No. 10, Mar. 1975, pp. 3066-3067.

*Primary Examiner*—Joseph W. Hartary
*Attorney, Agent, or Firm*—Frank C. Leach, Jr.

[57] ABSTRACT

A multi-nozzle ink jet array has all of the nozzles arranged in a single plane with each of the nozzles having a longitudinal passage extending therethrough of the same diameter. The lengths of the longitudinal passages of the nozzles at each end of the array are shorter than those in the center of the array to cause an increased initial velocity of the ink jet streams flowing therefrom so as to compensate for aerodynamic drag on the end streams.

2 Claims, 5 Drawing Figures

COMPENSATION FOR AERODYNAMIC DRAG ON INK STREAMS FROM A MULTI-NOZZLE INK ARRAY

In an ink jet printing apparatus having an array of nozzles arranged in a single plane, the ink streams at each end of the array of nozzles are subjected to an aerodynamic drag. This is because the ink streams at the ends are more exposed to the ambient than those in the center.

This causes a variation in the velocities of the ink streams from the nozzles at each end of the array in comparison with the ink streams from the nozzles in the center of the array. As a result of this velocity variation, the ink droplets of the end streams will not strike a recording surface at the desired location. This reduction in the velocities of the end streams results in not having the desired high print resolution.

The present invention satisfactorily solves the foregoing problem through compensating for the velocity reduction of the end streams due to aerodynamic drag in comparison with the streams flowing from the center nozzles of the array so as to produce a substantially uniform line of ink droplets from all of the nozzles of the multi-nozzle array at the recording surface. Therefore, each of the droplets strikes the recording surface at the desired location so that a high print resolution is obtained.

The present invention causes each of the streams at each end of the array to have an initial velocity higher than the initial velocity of the streams flowing from the nozzles in the center of the array. The present invention produces the higher initial velocity from the nozzles at each end of the array through making the length of the longitudinal passage in each of the nozzles at each end of the array shorter than the longitudinal passage in each of the nozzles in the center of the array. This increased initial velocity is selected so that the reduction in the velocity due to the aerodynamic drag on each of the end streams results in the velocity of the streams from the end nozzles of the array being substantially the same as the velocity from the center nozzles of the array at the time of striking the recording surface.

As the length of the longitudinal passage in a nozzle increases, the drag on the stream increases. Therefore, the exit velocity of a stream flowing through a passage decreases as the length of the passage increases.

The present invention changes the length of the longitudinal passages in the nozzles through providing at least one end of at least each of the nozzles at each end of the multi-nozzle array on a convex curve. This reduces the length of the longitudinal passages of the nozzles at each end of the array.

An object of this invention is to compensate for velocity variations in the ink stream flowing from a multi-nozzle ink jet array due to aerodynamic drag.

Another object of this invention is to control the velocities of the ink jet streams flowing from a multi-nozzle ink jet array.

The foregoing and other objects, features, and advantages of the invention will be more apparent from the following more particular description of the preferred embodiments of the invention as illustrated in the accompanying drawing.

Figure 1:
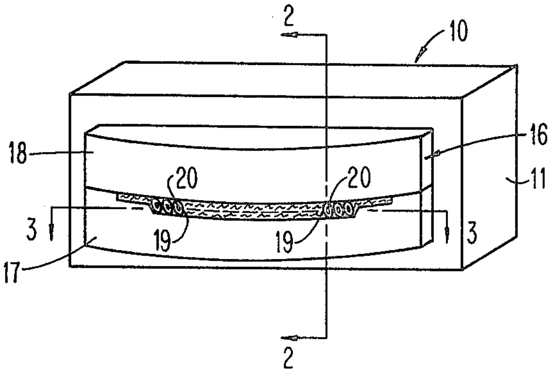
FIG. 1 is a perspective view of an ink jet head having a multi-nozzle array in which the nozzles are disposed in a single plane.
Figure 2:
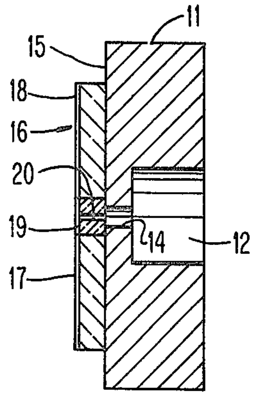
FIG. 2 is a sectional view of the ink jet head of FIG. 1 and taken along line 2—2 of FIG. 1.
Figure 3:
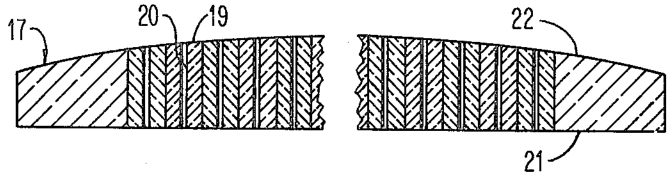
FIG. 3 is a sectional view of the array of FIG. 1 showing one arrangement of the nozzles of the present invention and taken along line 3—3 of FIG. 1.

Referring to the drawing and particularly FIGS. 1-3, there is shown an ink jet head 10 having a mounting plate 11. The mounting plate 11 includes a chamber 12, which forms part of an ink cavity. The remainder of the cavity is formed by any suitable means through which ink can be supplied under pressure from a reservoir.

The mounting plate 11 has a plurality of passages 14 (one shown) providing communication from the chamber 12 to a surface 15 of the mounting plate 11. The passages 14 are disposed in the same plane with each having the same diameter.

A wafer 16 is secured to the surface 15 of the mounting plate 11 in a manner such as that shown and described in U.S. Pat. No. 4,019,886 to Arthur R. Hoffman et al. As more particularly shown and described in the aforesaid Hoffman et al patent, the wafer 16 comprises a pair of plates 17 and 18, which are preferably formed of glass.

A plurality of nozzles 19, which are preferably glass capilliary tubes, is disposed between the plates 17 and 18 as more particularly shown and described in the aforesaid Hoffman et al patent. The tubes could be formed of Kimble R6 glass or Corning 7280 glass, for example, as more particularly described in the aforesaid Hoffman et al patent.

Each of the nozzles 19 has a longitudinal passage 20 of the same diameter extending therethrough. The diameter of the longitudinal passage 20 with respect to the diameter of the nozzle 19 is exaggerated in the drawing. For example, the diameter of the longitudinal passage 20 could be 0.7 mil when the diameter of the nozzle 19 is 12.5 mils. Each of the longitudinal passages 20 communicates with one of the passages 14 in the mounting plate 11 so that the pressurized ink can flow from the chamber 12 through the passage 14 in the mounting plate 11 and the longitudinal passage 20 as a stream after which the stream breaks up into droplets for application to a recording surface (not shown) in the well-known manner. Each of the streams is broken up into droplets by a piezoelectric transducer, for example, applying vibrations to the ink within the ink cavity, which includes the chamber 12.

As shown in FIG. 3, the plate 17 of the wafer 16 has its surface 21, which abuts the surface 15 of the mounting plate 11, formed as a straight line. The plate 17 of the wafer 16 has its other surface 22 formed as a convex curve. It should be understood that the plate 18 of the wafer 16 is similary shaped since the plates 17 and 18 are lapped and polished at the same time.

Accordingly, the lengths of the longitudinal passages 20 of the nozzles 19 progressively decrease from the center of the array to each end thereof. This reduction in length of the longitudinal passages 20 of the nozzles 19 at each end of the array causes the ink streams flowing therefrom to be at a higher initial velocity than the ink streams flowing from the center of the array. Thus, compensation for the aerodynamic drag on the end streams is produced.

The amount of curvature of the surface 22 of the plate 17 is exaggerated in the drawing. That is, for example, the radius might produce a chance in length of only 0.2 mil between one of the end nozzles 19 and the nozzle 19 at the center of the array where there is a distance of 275 mils between the centers of the nozzles 19 at each end of the array with the array having twenty-three of the nozzles 19 and each of the nozzles 19 having a diameter of 12.5 mils.

The length of each of the longitudinal passages 20 is selected so that the droplets of the ink streams from all of the nozzles 19 of the array arrive at the recording surface with the same velocity. Thus, the specific length of each of the longitudinal passages 20 of the nozzles 19 is controlled to cause the droplets of each of the ink streams to arrive at the recording surface at the same velocity so that the aerodynamic drag does not cause velocity variations in the ink streams at the time of arrival at the recording surface. For example, the length of the longitudinal passages 20 at each end of the array might be 1.5 mils while the longitudinal passage 20 at the center of the array would be 1.7 mils in length.

Figure 4:
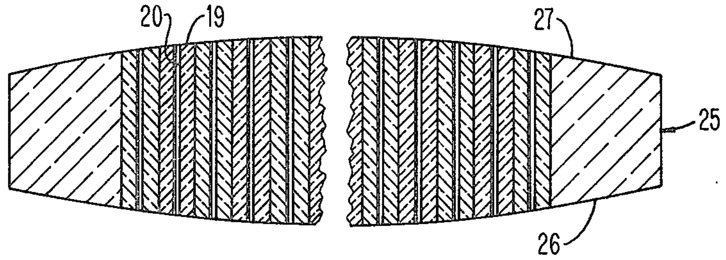
FIG. 4 is a sectional view, similar to FIG. 3, of another form of the arrangement of the nozzles.

Referring to FIG. 4, there is shown another form of the invention in which the wafer 16 has a plate 25 replacing the plate 17. The plate 25 has each of its surfaces 26 and 27 formed on a convex curve in the same manner as the surface 22 of the plate 17. The plate 18 would be shaped in the same manner as the plate 25 since they are lapped and polished at the same time.

The surface 15 of the mounting plate 11 would still remain flat. However, the epoxy, which secures the wafer 16 to the mounting plate 11, would flow between the surface 26 of the plate 25 and the surface 15 of the mounting plate 11 to fill the space therebetween except for the diameter of each of the passages 14 in the mounting plate 11. Thus, the epoxy would not prevent communication between each of the passages 14 and the longitudinal passage 20 of the nozzle 19 with which the passage 14 is aligned but would prevent any communication with the adjacent passages 14 or the adjacent longitudinal passages 20 even though the surface 26 of the plate 25 is a convex curve.

Figure 5:
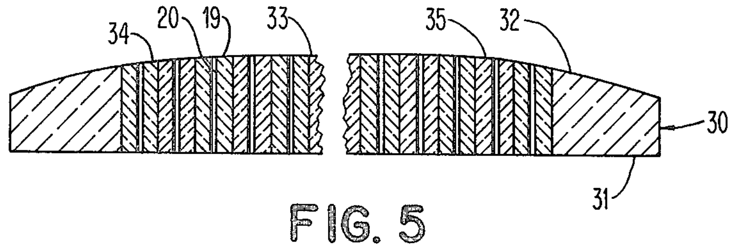
FIG. 5 is a sectional view, similar to FIG. 3, of a further modification of the arrangement of the nozzles.

Referring to FIG. 5, there is shown another form of the invention in which the plate 17 is replaced by a plate 30. The plate 30 has a flat surface 31, which abuts the surface 15 of the mounting plate 11 in the same manner as the surface 21 of the plate 17. The plate 30 has its surface 32 formed with a central flat portion 33 and convex curved portions 34 and 35 extending from each end of the flat portion 33. The surfaces of the plate 118 would be similarly shaped as the plate 30 since they are lapped and polished at the same time.

It is only necessary for the longitudinal passages 20 of the first three or four of the nozzles 19 at each end of the array to actually have a length shorter than the remainder of the nozzles 19 irrespective of the number of the nozzles 19 forming the array. Thus, it is not necessary for the wafer 16 to have either the surface, which abuts the surface 15 of the mounting plate 11, or its other side formed along a continuous curve in order to compensate for the velocity variations of the ink streams due to aerodynamic drag. It is only necessary that the ink streams which are subjected to the aerodynamic drag to flow from one of the longitudinal passages 20 of the nozzles 19 of a shorter length than the length of the remainder of the longitudinal passages 20.

While the longitudinal passages 20 have been shown and described as having a circular cross section, it should be understood that such is not a requisite. It is only necessary that each of the longitudinal passages 20 have the same cross sectional area and that the area be constant.

An advantage of this invention is that it causes each ink jet stream from a multiple nozzle array to have substantially the same velocity at the time of impact with the recording surface. Another advantage of this invention is that a substantially uniform line of ink droplets from a multiple nozzle array is produced at the plane of the recording surface. A further advantage of this invention is that high resolution printing is obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An ink jet head including:
an array of nozzles;
said nozzles being arranged in a single plane;
each of said nozzles having a longitudinal passage of a constant cross sectional area extending therethrough, each of the cross sectional areas being the same;
said longitudinal passages for ink streams slowed by the ambient having a length less than the length of said longitudinal passages for ink streams not slowed by the ambient so that an ink stream flowing through each of said longitudinal passages of shorter length has an initial velocity greater than the ink streams flowing through said longitudinal passages for ink streams not slowed by the ambient to compensate for aerodynamic drag on the ink streams slowed by the ambient;
and one end of each of said longitudinal passages is on a first convex curve and the other end of each of said longitudinal passages is on a second convex curve.

2. An ink jet head including:
an array of nozzles;
each of said nozzles having a longitudinal passage of a constant cross sectional area extending therethrough, each of the cross sectional areas being the same;
said longitudinal passages for ink streams slowed by the ambient having a length less than the length of said longitudinal passages for ink streams not slowed by the ambient so that an ink stream flowing through each of said longitudinal passages of shorter length has an initial velocity greater than the ink streams flowing through said longitudinal passages for ink streams not slowed by the ambient to compensate for aerodynamic drag on the ink streams slowed by the ambient;
and one end of each of said longitudinal passages is on a first convex curve and the other end of each of said longitudinal passages is on a second convex curve.

* * * * *